(12) United States Patent
Takizawa et al.

(10) Patent No.: US 9,287,981 B2
(45) Date of Patent: Mar. 15, 2016

(54) STATION-SIDE APPARATUS AND PON SYSTEM

(71) Applicant: Fujitsu Telecom Networks Limited, Kawasaki-shi, Kanagawa (JP)

(72) Inventors: Motoyuki Takizawa, Kawasaki (JP); Tetsuya Yokomoto, Kawasaki (JP); Koichi Seki, Kawasaki (JP); Takashi Ohira, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 13/761,076

(22) Filed: Feb. 6, 2013

(65) Prior Publication Data

US 2013/0148968 A1 Jun. 13, 2013

Related U.S. Application Data

(63) Continuation of application No. PCT/JP2010/005025, filed on Aug. 10, 2010.

(51) Int. Cl.
| | |
|---|---|
| *H04J 4/00* | (2006.01) |
| *H04B 10/27* | (2013.01) |
| *H04L 7/04* | (2006.01) |
| *H04L 12/44* | (2006.01) |
| *H04L 12/413* | (2006.01) |
| *H04Q 11/00* | (2006.01) |

(52) U.S. Cl.
CPC .......... *H04B 10/27* (2013.01); *H04L 7/04* (2013.01); *H04L 12/413* (2013.01); *H04L 12/44* (2013.01); *H04Q 11/0067* (2013.01); *H04Q 2011/0079* (2013.01)

(58) Field of Classification Search
CPC ......... H04L 7/04; H04L 12/44; H04L 12/413; H04Q 11/0067; H04Q 2011/0079; H04B 10/27; H04J 3/1694; H04J 3/0682

See application file for complete search history.

(56) References Cited

U.S. PATENT DOCUMENTS

| | | | |
|---|---|---|---|
| 2007/0140694 A1* | 6/2007 | Choi et al. | 398/71 |
| 2009/0052897 A1* | 2/2009 | Kazawa et al. | 398/71 |
| 2009/0190931 A1* | 7/2009 | Hamano et al. | 398/99 |
| 2010/0104286 A1* | 4/2010 | Okuno et al. | 398/66 |

(Continued)

FOREIGN PATENT DOCUMENTS

| | | |
|---|---|---|
| CN | 101162963 A | 4/2008 |
| CN | 101453671 A | 6/2009 |

(Continued)

OTHER PUBLICATIONS

International Search Report for PCT/JP2010/005025, dated Nov. 22, 2010, 2 pages.

(Continued)

*Primary Examiner* — Ken Vanderpuye
*Assistant Examiner* — David Lambert
(74) *Attorney, Agent, or Firm* — Staas & Halsey LLP

(57) ABSTRACT

An OLT, which is a station-side apparatus in a PON system, is connected to an ONU via an optical fiber. The OLT includes: an optical receiver which receives a burst signal from an ONU; a burst header detection unit which detects a certain delimiter pattern included in a received burst signal so as to establish synchronization of the burst signal; and a control unit which allows the burst header detection unit to perform detection of a delimiter pattern during a predicted reception period of a burst signal.

4 Claims, 7 Drawing Sheets

(56) References Cited

U.S. PATENT DOCUMENTS

2010/0316379 A1* 12/2010 Suvakovic ............... 398/58
2011/0001530 A1* 1/2011 Nishi et al. ............. 327/162

FOREIGN PATENT DOCUMENTS

| | | |
|---|---|---|
| CN | 101572833 A | 11/2009 |
| CN | 101577590 A | 11/2009 |
| CN | 101610429 A | 12/2009 |
| JP | 2007-173908 | 7/2007 |
| JP | 2012-529854 A | 11/2012 |
| WO | WO 2010/144382 | 12/2010 |

OTHER PUBLICATIONS

International Preliminary Report on Patentability with Written Opinion on Patentability for PCT/JP2010/005025, dated Feb. 12, 2013, 4 pages.
English Translation of International Preliminary Report with Written Opinion on Patentability for PCT/JP2010/005025, dated Mar. 12, 2013, 4 pages.
Notification of Reason(s) for Refusal dispatched by the Japanese Patent Office for JP application No. 2012-528515 on Oct. 29, 2013, with English translation, 4 pages.
Chinese Office action with English Translation for Patent Application No. 201080068482.4, issued on Nov. 3, 2014, 14 pages.

* cited by examiner

STATION-SIDE APPARATUS AND PON SYSTEM

CROSS-REFERENCE TO RELATED APPLICATION

This application is a continuation application of International Application Number PCT/JP2010/005025, filed on Aug. 10, 2010, the entire disclosure of which is incorporated herein by reference.

BACKGROUND OF THE INVENTION

1. Field of the Invention

The present invention relates to a station-side apparatus and a passive optical network (PON) system using the apparatus.

2. Description of the Related Art

PON systems have been conventionally known for subscriber optical fiber network systems provided for subscribers' homes including ordinary households (see Patent Document 1, for example). A PON system comprises a station-side apparatus {hereinafter, also referred to as an optical line terminal (OLT)}, multiple subscriber-side apparatuses {hereinafter, also referred to as optical network units (ONUs)}, an optical fiber provided between the OLT and ONUs, and an optical splitter that branches the optical fiber. In a PON system, a single optical fiber connected to an OLT is shared by multiple ONUs, thereby constructing an optical communication network at low cost.

As a PON system, GE-PON {Gigabit Ethernet (registered trademark)-Passive Optical Network}, which is standardized in IEEE802.3ah and offers a transmission rate of 1 Gbps, is well known.

In recent years, 10G-EPON {10 Gigabit-Ethernet (registered trademark) Passive Optical Network}, which offers a transmission rate of 10 Gbps, has been standardized in IEEE802.3av as a next-generation technology of GE-PON. A 10G-EPON provides a higher transmission rate of 10 Gbps compared to a GE-PON but basically adheres to the techniques of GE-PON. For upstream communication from an ONU to an OLT, 10G-EPON employs a burst transmission technique using control by means of the dynamic bandwidth allocating function {hereinafter, also referred to as dynamic bandwidth allocation (DBA)}.

An upstream burst signal standardized in IEEE802.3ah or IEEE802.3av comprises a burst header at the beginning, which is used for bit synchronization and frame synchronization, and a data frame subsequent thereto. In a GE-PON, a burst header contains repetition of an idle pattern defined using 8B/10B encoding and is used for stabilization of an optical receiver that receives burst signals and for establishment of burst signal synchronization. In a 10G-EPON, on the other hand, a burst header consists of a sync pattern and a burst delimiter. The sync pattern is repetition of a 66-bit fixed pattern and is used for stabilization of an optical receiver that receives burst signals. The burst delimiter is a 66-bit fixed pattern, which is different from that in the sync pattern, and is used for establishment of burst signal synchronization.

When an OLT receives an upstream burst signal from an ONU, an optical receiver in the OLT performs processes including photoelectric conversion, clock extraction, and regenerating. Then, serial-parallel conversion is performed on the burst signal, and an idle pattern is detected in a GE-PON and a burst delimiter is detected in a 10G-EPON, so as to establish burst signal synchronization.

In a GE-PON, when the data pattern in a burst header has perfectly matched an idle pattern defined using 8B/10B encoding, it is determined that a burst signal has been detected, so that synchronization of the burst signal is established. In a 10G-EPON, on the other hand, when 55 bits or more in a 66-bit burst delimiter have matched corresponding bits in a fixed pattern, it is determined that a burst delimiter has been detected, so that synchronization of the burst signal is established. In a 10G-EPON, error correction using forward error correction (FEC) is required, and such correction is performed after the detection of a burst delimiter. Accordingly, at the time of detection of a burst delimiter, the burst signal may possibly have a bit error rate of about $10 \times 10^{-3}$. Therefore, if the detection of a burst delimiter is performed under the same conditions as in a GE-PON, it might be unable to achieve burst signal synchronization appropriately. In consideration thereof, eased detection conditions are set for a burst delimiter in a 10G-EPON when compared to those in a GE-PON, enabling appropriate establishment of burst signal synchronization.

[Patent Document 1] Japanese Patent Application Laid-open No. 2007-173908

However, depending on its specifications, an optical receiver for an OLT, which receives burst signals, may output a noise signal during a period between times when the optical receiver receives burst signals, i.e., a period in which no optical signals are input. If such a noise signal happens to meet the detection conditions for a burst delimiter, false synchronization of a burst signal might be caused.

SUMMARY OF THE INVENTION

The present invention has been made in view of such a situation, and a purpose thereof is to restrain false synchronization of a burst signal in a station-side apparatus of a PON system.

To solve the problem above, a station-side apparatus of an embodiment of the present invention is provided for a PON system and connected to a subscriber-side apparatus via an optical fiber. The station-side apparatus comprises: a receiving unit configured to receive a burst signal from a subscriber-side apparatus; a detection unit configured to detect a predetermined synchronization pattern included in a received burst signal so as to establish synchronization of the burst signal; and a control unit configured to allow the detection unit to perform detection of a synchronization pattern during a predicted reception period of a burst signal.

According to this embodiment, detection of a synchronization pattern is performed during a predicted reception period of a burst signal, so that the situation can be prevented where false synchronization of a burst signal is caused by a noise signal generated during a period for which no optical signal is input.

The station-side apparatus may further comprise a dynamic bandwidth allocating unit configured to control the transmission start time and the transmission amount of a burst signal from a subscriber-side apparatus and to retain distance information with regard to the distance between the station-side apparatus and a subscriber-side apparatus. The control unit may predict the reception period of a burst signal on the basis of pieces of information with regard to the transmission start time, transmission amount, and distance acquired from the dynamic bandwidth allocating unit.

The control unit may allow the detection unit to perform detection of a synchronization pattern during a discovery period for which a registration request frame from an unregistered subscriber-side apparatus is accepted.

When the detection unit detects a synchronization pattern in a registration request frame during a discovery period, the control unit may allow the detection unit to once stop the detection of a synchronization pattern, and, if it is still within the discovery period at the time when the processing of the registration request frame is completed, the control unit may allow the detection unit to resume the detection of a synchronization pattern.

The control unit may set a detection condition for a synchronization pattern during a discovery period harder than that during the other periods.

If a receive error has occurred within a discovery period, the control unit may set the discovery period shorter for the next time and thereafter.

The receiving unit may be configured to receive a burst signal transmitted at a first transmission rate and a burst signal transmitted at a second transmission rate and to switch the output destination of a burst signal in accordance with the transmission rate thereof. The detection unit may comprise a first detection unit configured to detect a synchronization pattern included in a burst signal transmitted at the first transmission rate, and a second detection unit configured to detect a synchronization pattern included in a burst signal transmitted at the second transmission rate. The control unit may allow the first detection unit to perform detection of a synchronization pattern during a predicted reception period of a burst signal transmitted at the first transmission rate and also may allow the second detection unit to perform detection of a synchronization pattern during a predicted reception period of a burst signal transmitted at the second transmission rate.

Another embodiment of the present invention is a PON system. The PON system comprises the station-side apparatus described above and a subscriber-side apparatus connected to the station-side apparatus via an optical fiber.

This embodiment provides a reliable PON system in which false synchronization of a burst signal is restrained.

Yet another embodiment of the present invention is also a station-side apparatus. The station-side apparatus is also provided for a PON system and connected to a subscriber-side apparatus via an optical fiber. The station-side apparatus comprises: a receiving unit configured to receive a burst signal from a subscriber-side apparatus; a detection unit configured to detect a predetermined synchronization pattern included in a received burst signal so as to establish synchronization of the burst signal; and a control unit configured to set, during a period for which the reception period of a burst signal cannot be predicted, a detection condition for a synchronization pattern harder than that during the other periods.

According to this embodiment, by setting, during a period for which the reception period of a burst signal cannot be predicted, a detection condition for a synchronization pattern harder than that during the other periods, false detections of a synchronization pattern can be reduced within such a period, thereby restraining false synchronization of a burst signal.

Optional combinations of the aforementioned constituting elements, and implementations of the invention in the form of apparatuses, methods, systems, programs, and recording media storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
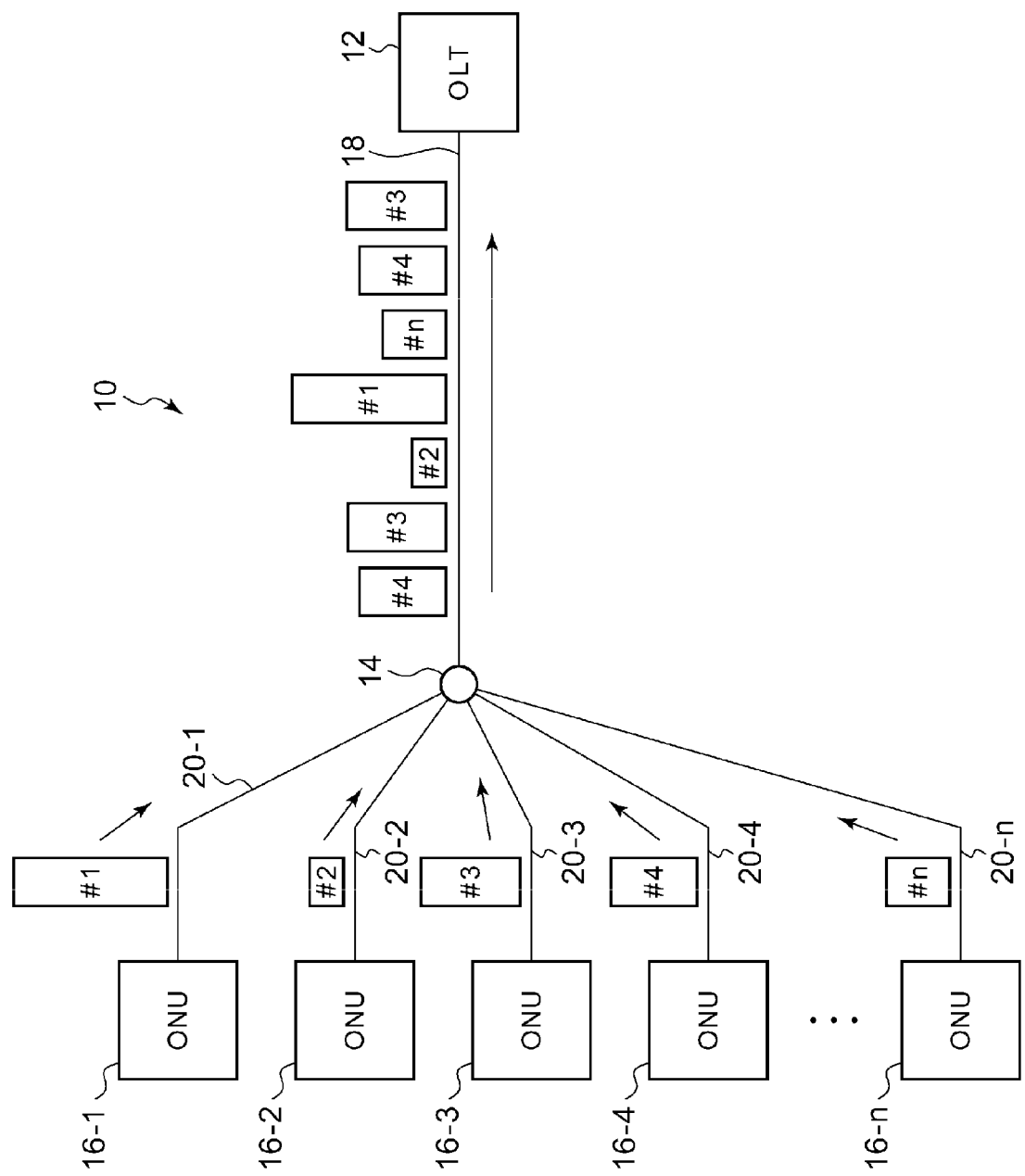
FIG. 1 shows a PON system according to an embodiment of the present invention.

FIG. 1 shows a PON system according to an embodiment of the present invention. A PON system 10 in the present embodiment is a 10G-EPON system that provides a transmission rate of 10 Gbps. In the PON system 10, a trunk optical fiber 18 connected to an OLT 12 is branched by an optical splitter 14 into multiple branch optical fibers 20-1 through 20-n, of which the ends are respectively connected to multiple subscriber-side apparatuses (ONUs) 16-1 through 16-n, as shown in FIG. 1. In the following, the ONUs 16-1 through 16-n may be collectively referred to as "ONUs 16", as needed.

In the PON system 10, downstream optical signals from the OLT 12 to the respective ONUs 16 are continuous optical signals multiplexed using time division multiplexing (TDM). On the other hand, upstream optical signals from the respective ONUs 16 to the OLT 12 are multiplexed using time division multiple access (TDMA). In TDMA, a no-signal period called guard time is inserted between optical signals transmitted from the respective ONUs 16 in order to prevent a collision between the signals. Therefore, although downstream optical signals from the OLT 12 to the respective ONUs 16 are continuous optical signals, upstream optical signals from the respective ONUs 16 to the OLT 12 are burst optical signals transmitted intermittently.

FIG. 1 shows burst signals #1 through #n transmitted respectively from the ONUs 16-1 through 16-n, which are multiplexed by the optical splitter 14 to be input to the OLT 12 as a burst signal sequence. In the present embodiment, an upstream burst signal from each ONU 16 is transmitted at 10 Gbps.

In a PON system, the transmission order of burst signals from ONUs and a signal band allocated to each ONU are generally controlled using the dynamic bandwidth allocating (DBA) function of the OLT. In FIG. 1, a burst signal sequence is configured with the burst signals #3, #4, #n . . . arranged in this order by means of DBA.

In the PON system 10, since the branch optical fibers 20-1 through 20-n respectively connected to the ONUs 16-1 through 16-n have lengths different from each other, each of the burst signals in the burst signal sequence input to the OLT 12 has a different optical level. Accordingly, the optical module of the OLT 12 is required to have light receiving characteristics suitable for a significantly wide dynamic range.

Figure 2:
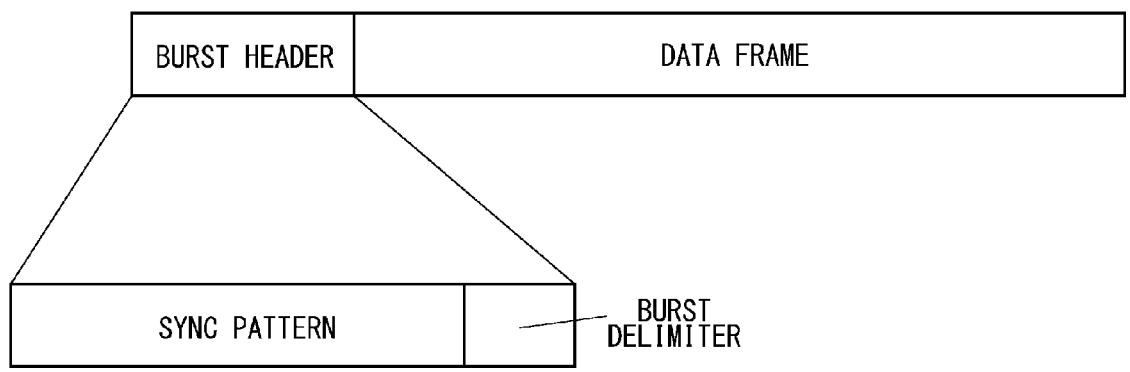
FIG. 2 is a diagram for describing a frame configuration of a burst signal.

FIG. 2 shows a frame configuration of a burst signal. As shown therein, a burst signal comprises a burst header, which is provided at the beginning and used for bit synchronization and frame synchronization, and a data frame provided subsequent thereto. The burst header includes a sync pattern and a burst delimiter. The sync pattern is repetition of a 66-bit fixed pattern and is used for stabilization of an optical receiver that receives burst signals. The burst delimiter is a 66-bit fixed pattern, which is different from that in the sync pattern, and is used as a synchronization pattern for establishment of burst signal synchronization. The data frame includes data to be transmitted and parity data attached thereto, which is used to perform FEC.

Figure 3:
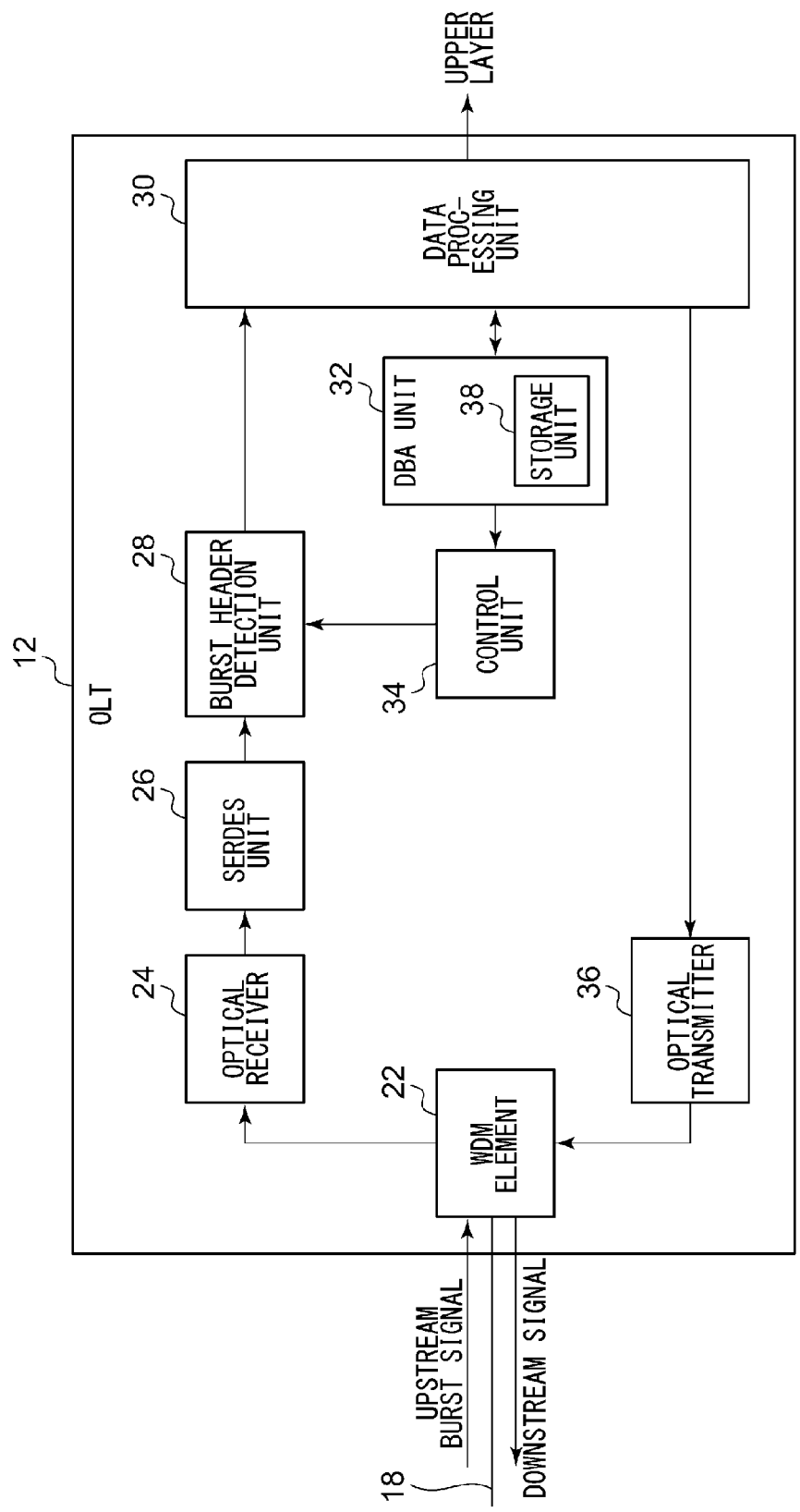
FIG. 3 is a functional block diagram of a station-side apparatus according to the embodiment of the present invention.

FIG. 3 is a functional block diagram of a station-side apparatus (an OLT) according to the embodiment of the present invention. As shown therein, the OLT 12 comprises a WDM element 22, an optical receiver 24, a SERDES unit 26, a burst header detection unit 28, a data processing unit 30, a DBA unit 32, a control unit 34, and an optical transmitter 36.

Upstream burst signals transmitted from ONUs 16 via the trunk optical fiber 18 are branched by the WDM element before being input to the optical receiver 24. The optical receiver 24 performs predetermined processes, such as photoelectric conversion, amplification, clock extraction, and regenerating, on the received burst signal and transmits the signal to the SERDES (SERializer/DESerializer) unit 26. The SERDES unit 26 performs serial-parallel conversion on the burst signal and transmits the resulting signal to the burst header detection unit 28.

The burst header detection unit 28 detects a 66-bit burst delimiter included in a burst signal to establish frame synchronization of the burst signal. In the present embodiment, when 55 bits or more in a 66-bit burst delimiter have matched corresponding bits in a predetermined fixed pattern, the burst header detection unit 28 determines that a burst delimiter has been detected and then establishes synchronization of the burst signal. The burst signal of which the synchronization has been established by the burst header detection unit 28 is then transmitted to the data processing unit 30.

The data processing unit 30 performs predetermined digital signal processes, such as FEC decoding, descrambling, and 64B/66B decoding, on the data frame of a burst signal before outputting the resulting 64-bit data to an upper layer.

The optical transmitter 36 receives from the data processing unit 30 a downstream signal to each ONU 16, converts the signal into an optical signal, and outputs the resulting signal to the trunk optical fiber 18 via the WDM element 22.

The DBA unit 32 is a functional block that performs dynamic bandwidth allocation. The DBA unit 32 uses a multi-point control protocol (MPCP) frame to control the transmission start time and the transmission amount of an upstream burst signal provided by each ONU 16. The DBA unit 32 performs dynamic bandwidth allocation by exchanging a "GATE frame" and a "REPORT frame" with an ONU 16. A GATE frame is a frame transmitted by the OLT 12 to each ONU 16 in order to convey the transmission start time and the transmission amount of a burst signal. A REPORT frame is a frame transmitted by an ONU 16 to the OLT 12 in order to convey the amount of data stored in the ONU 16 and waiting to be transmitted. The DBA unit 32 repeatedly exchanges GATE frames and REPORT frames between the OLT 12 and each ONU 16 to comprehend the condition of upstream traffic from the ONU 16, thereby appropriately controlling the transmission start time and the transmission amount of a burst signal from each ONU 16 so as to prevent a collision between burst signals transmitted from the respective ONUs 16.

The DBA unit 32 also includes a storage unit 38 configured to retain distance information on the distance between the OLT 12 and each ONU 16. The distance information on the distance between the OLT 12 and each ONU 16 is obtained by measuring, during a discovery handshake that is performed when an ONU 16 connects to the OLT 12, a time period required when the OLT 12 transmits a frame to the ONU 16 and the ONU 16 then transmits another frame to the OLT 12 in return.

The control unit 34 is a functional block that controls timing at which the burst header detection unit 28 performs burst delimiter detection. When the control unit 34 outputs an enable signal to the burst header detection unit 28, the burst header detection unit 28 is allowed to perform burst delimiter detection. When the control unit 34 outputs a disable signal to the burst header detection unit 28, on the other hand, the burst header detection unit 28 is made to stop burst delimiter detection.

In the present embodiment, the control unit 34 predicts the reception period of a burst signal and outputs an enable signal to the burst header detection unit 28 during the predicted reception period so as to allow the burst header detection unit 28 to perform burst delimiter detection. The predicted reception period of a burst signal can be calculated based on transmission start time information and transmission amount information of the burst signal and distance information on the distance between the OLT 12 and the related ONU 16, and such pieces of information are retained by the DBA unit 32. During a period for which a burst signal is not expected to be received, such as guard time between burst signals, the control unit 34 outputs a disable signal to the burst header detection unit 28 so as to make the burst header detection unit 28 stop burst delimiter detection.

Figure 4:
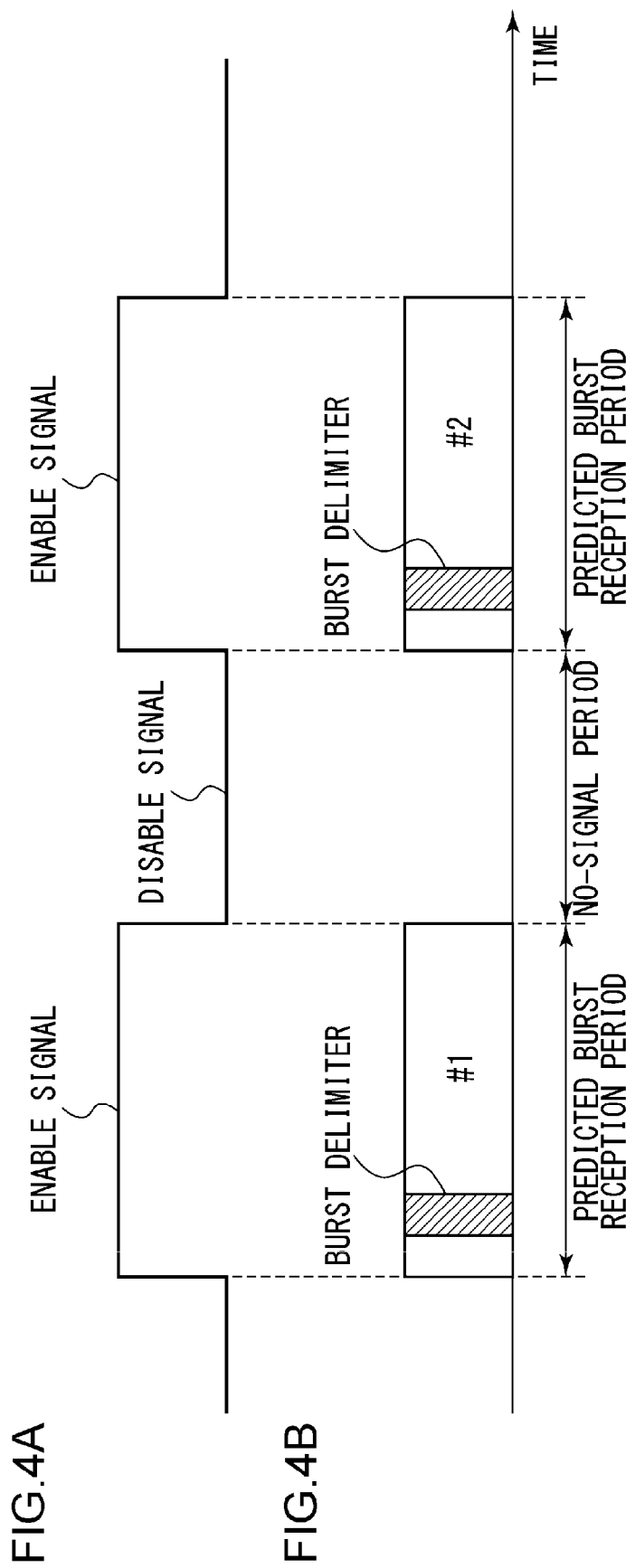
FIGS. 4A and 4B show a timing chart for describing operations of a control unit when burst signals are received.

FIGS. 4A and 4B show a timing chart for describing operations of the control unit 34 when burst signals are received. FIG. 4A shows signals output by the control unit 34 to the burst header detection unit 28. FIG. 4B shows received burst signals #1 and #2.

As shown in FIGS. 4A and 4B, the control unit 34 outputs an enable signal for the predicted reception period of each of the burst signals #1 and #2. Accordingly, the burst header detection unit 28 detects the burst delimiters of the burst signals #1 and #2, so that the synchronization of the signals can be established.

The control unit 34 also outputs a disable signal to the burst header detection unit 28 during a no-signal period, for which no signal is input, between the burst signals #1 and #2. Accordingly, the burst header detection unit 28 stops burst delimiter detection during the no-signal period.

During the no-signal period between the burst signals #1 and #2, the operation of the circuit in the optical receiver 24 may become unstable depending on the circuit configuration, and the optical receiver 24 may output a noise signal in such a condition. If the noise signal happens to meet the detection conditions for a burst delimiter in the burst header detection unit 28, false synchronization of a burst signal might be caused. Accordingly, in the present embodiment, the reception period of a burst signal is predicted using information retained by the DBA unit 32, and the burst header detection unit 28 is allowed to perform burst delimiter detection during the predicted reception period of the burst signal. On the other hand, the burst header detection unit 28 is made to stop burst delimiter detection during a no-signal period. Therefore, even if the optical receiver 24 outputs a noise signal during a no-signal period, the situation can be avoided where a burst delimiter is detected from the noise signal and false synchronization is caused.

Although the reception period of a burst signal is illustrated so as to coincide with the output time of an enable signal in FIGS. 4A and 4B, they may not necessarily coincide with each other. For example, considering the fact that the predicted reception period of a burst signal may slightly differ from the real reception period thereof, the output time of an enable signal may be set longer than the predicted reception period of a burst signal.

Conversely, the output time of an enable signal may be shorter than the predicted reception period of a burst signal as long as the enable signal is being output while the burst delimiter of the burst signal is received. Since the position and length of a burst delimiter in a burst signal are fixed, the reception period of a burst delimiter can be predicted based on the reception period of the burst signal. In a 10G-EPON, since a burst signal may possibly contain a number of errors at the stage of burst delimiter detection, false synchronization of a burst signal might be caused also in the case where a pattern containing an error happens to meet the detection conditions for a burst delimiter. Accordingly, by allowing the burst header detection unit 28 to operate for a shorter period as stated above, false synchronization of a burst signal can be restrained.

Figure 5:
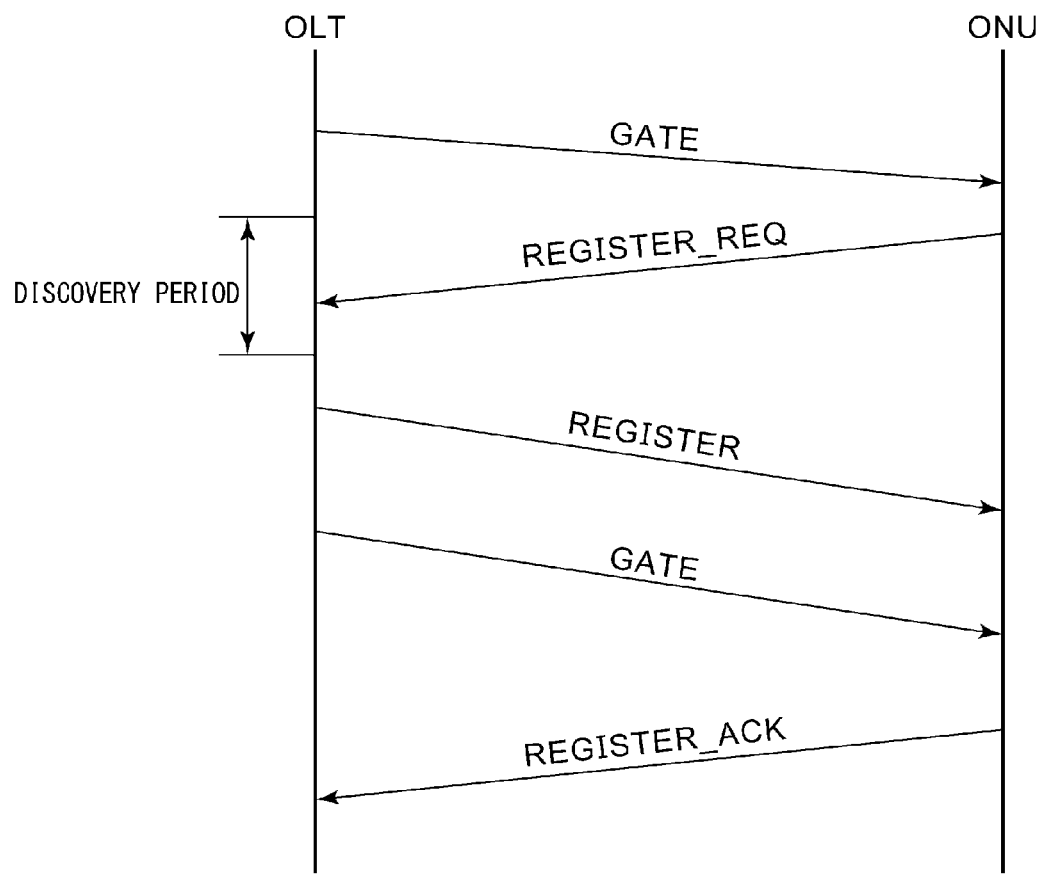
FIG. 5 is a diagram for describing a discovery handshake performed when a subscriber-side apparatus is newly registered in the station-side apparatus.

FIG. 5 is a diagram for describing a discovery handshake performed when an ONU is newly registered in the OLT. In a 10G-EPON, when a new ONU is connected to the PON, the OLT automatically discovers the ONU and assigns a logical link ID (LLID) thereto, so as to establish a communication link automatically. This function is called a discovery handshake.

In a discovery handshake, the DBA unit 32 in the OLT 12 first transmits to an unregistered ONU 16 a "GATE frame" so as to notify the ONU 16 of transmission timing. The DBA unit 32 also sets a "discovery period" for which a registration request from an unregistered ONU 16 is accepted. The unregistered ONU 16, which has received the GATE frame, transmits to the OLT 12 a "REGISTER_REQ frame" as a registration request frame. When the DBA unit 32 in the OLT 12 receives a REGISTER_REQ frame within a discovery period, the DBA unit 32 transmits to the ONU 16 that has transmitted the frame a "REGISTER frame" to convey an LLID. The DBA unit 32 also transmits to the ONU 16 another GATE frame to convey a transmission band and transmission timing. In response thereto, the ONU 16 transmits a "REGISTER_ACK frame" to acknowledge the receipt of the registration notification, so that the discovery handshake is completed.

In the burst delimiter detection set forth above, the reception period of a burst signal is predicted based on the transmission start time information and the transmission amount information of the burst signal and the distance information on the distance between the OLT 12 and the related ONU 16, and such pieces of information are retained by the DBA unit 32 in the OLT 12. However, at the stage of the discovery handshake, the OLT 12 does not retain any information on an ONU 16 to be newly registered. Accordingly, the control unit 34 in the OLT 12 cannot predict the reception period of a REGISTER_REQ frame within a discovery period. Therefore, if burst delimiter detection is performed as described above, it might be unable to detect a REGISTER_REQ frame from an unregistered ONU 16.

Accordingly, in the present embodiment, the control unit 34 in the OLT 12 allows the burst header detection unit 28 to perform burst delimiter detection during a discovery period for which a REGISTER_REQ frame from an ONU is accepted. This can avoid the situation where a REGISTER_REQ frame from an unregistered ONU 16 is missed.

Also, the control unit 34 may allow the burst header detection unit 28 to stop burst delimiter detection for a certain period of time within a discovery period. For example, when the burst header detection unit 28 detects a burst delimiter of a REGISTER_REQ frame transmitted from an ONU during a discovery period, the control unit 34 may allow the burst header detection unit 28 to once stop the burst delimiter detection. Thereafter, if it is still within the discovery period when the synchronization of the REGISTER_REQ frame is established, the control unit 34 may allow the burst header detection unit 28 to resume the burst delimiter detection. If the burst delimiter detection is performed throughout the discovery period, false synchronization of a burst signal might occur when the REGISTER_REQ frame is not input within the discovery period. However, by providing a time period for which burst delimiter detection is stopped within the discovery period as stated above, false synchronization of a burst signal can be restrained.

Further, the control unit 34 may set a detection condition for a burst delimiter during the discovery period harder than that during the other periods. For example, although it is determined that a burst delimiter has been detected when 55 bits or more in a 66-bit burst delimiter have matched corresponding bits in a fixed pattern during a period other than the discovery period, such determination may be made only when the burst delimiter has perfectly matched the fixed pattern during the discovery period. Accordingly, false detections of burst delimiters can be reduced within the discovery period, so that false synchronization of a burst signal can be restrained.

If a receive error has occurred within a discovery period, the control unit 34 may set the discovery period shorter than till then for the next time and thereafter. When a receive error has occurred within a discovery period, it is considered that a burst delimiter has been detected in a noise signal output by the optical receiver 24, causing a false detection of a burst signal. Accordingly, by setting the discovery period shorter than till then for the next time and thereafter, noise signals can be reduced, thereby restraining a false detection of a burst delimiter.

Figure 6:
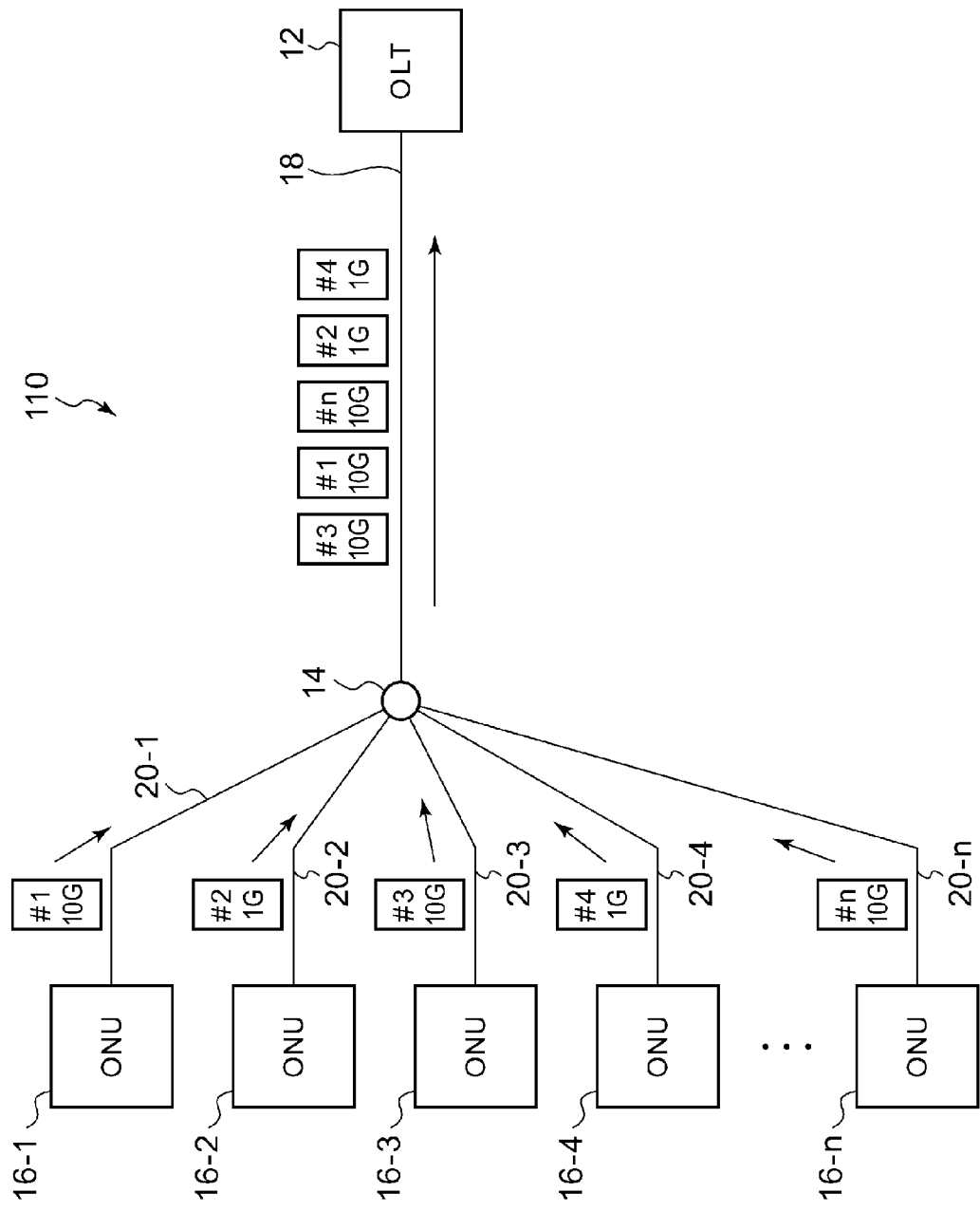
FIG. 6 shows a PON system according to another embodiment of the present invention.

FIG. 6 shows a PON system according to another embodiment of the present invention. A PON system 110 shown in FIG. 6 is a PON system in which both ONUs for GE-PON and ONUs for 10G-EPON are involved. Like reference characters designate like or corresponding elements in the PON system 110 in FIG. 6 and the PON system 10 in FIG. 1, and the description thereof will not be repeated for brevity.

In the PON system 110, as shown in FIG. 6, ONUs 16-1, 16-3, and 16-n transmit upstream burst signals #1, #3, and #n, respectively, at 10 Gbps. Also, ONUs 16-2 and 16-4 transmit upstream burst signals #2 and #4, respectively, at 1 Gbps. Also in the PON system 110, the transmission order of burst signals and a signal band allocated to each ONU are controlled using the DBA function of the OLT 12. In FIG. 6, a burst signal sequence is configured with the burst signals #4, #2, #n, #1, and #3 arranged in this order by means of DBA.

Figure 7:
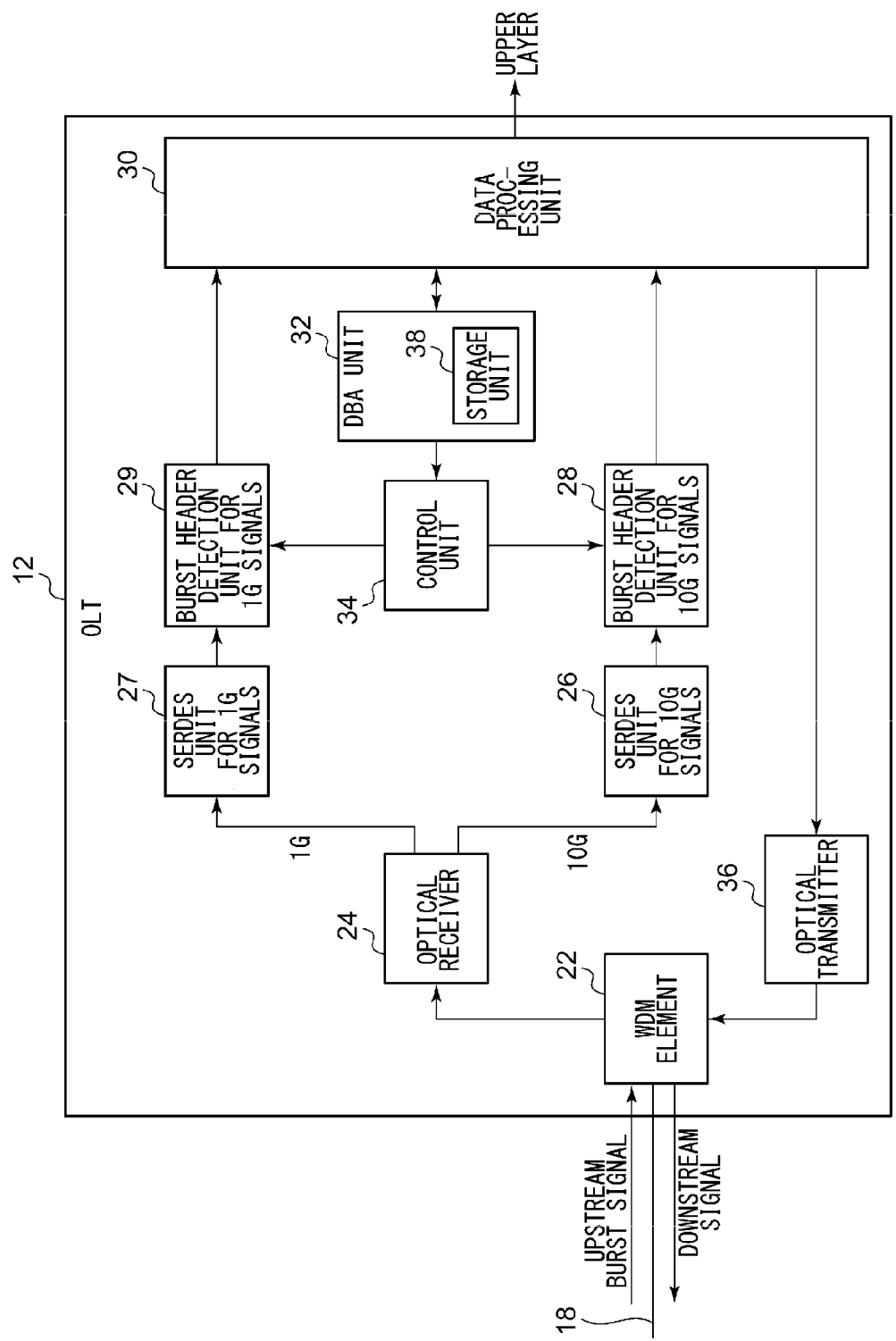
FIG. 7 is a functional block diagram of a station-side apparatus used in the PON system shown in FIG. 6.

FIG. 7 is a functional block diagram of the OLT 12 used in the PON system 110 shown in FIG. 6. The OLT 12 in FIG. 7 comprises a WDM element 22, an optical receiver 24, a SERDES unit for 10G signals 26, a SERDES unit for 1G signals 27, a burst header detection unit for 10G signals 28, a burst header detection unit for 1G signals 29, a data processing unit 30, a DBA unit 32, a control unit 34, and an optical transmitter 36.

The optical receiver 24 in the present embodiment receives a burst signal sequence including both 1G burst signals and 10G burst signals. Besides the function of photoelectric conversion or amplification, the optical receiver 24 has a function of switching the output destination of a burst signal according to the transmission rate of the burst signal. A 1G burst signal is output to the SERDES unit for 1G signals 27, while a 10G burst signal is output to the SERDES unit for 10G signals 26.

The SERDES unit for 1G signals 27 performs serial-parallel conversion on a received 1G burst signal and transmits the resulting signal to the burst header detection unit for 1G signals 29. When the data pattern in a received burst header has perfectly matched an idle pattern defined using 8B/10B encoding, the burst header detection unit for 1G signals 29 determines that a burst signal has been detected and then establishes synchronization of the 1G burst signal. Thereafter, the data processing unit 30 performs predetermined digital signal processes on the 1G burst signal before outputting the signal to an upper layer.

Meanwhile, the SERDES unit for 10G signals 26 performs serial-parallel conversion on a received 10G burst signal and transmits the resulting signal to the burst header detection unit for 10G signals 28. When 55 bits or more in a 66-bit burst delimiter have matched corresponding bits in a certain fixed pattern, the burst header detection unit for 10G signals 28 determines that a burst delimiter has been detected and then establishes synchronization of the 10G burst signal. Thereafter, the data processing unit performs predetermined digital signal processes on the 10G burst signal before outputting the signal to an upper layer.

The DBA unit 32 controls the transmission start time and the transmission amount of an upstream burst signal provided by each ONU for 1G signals and each ONU for 10G signals. Also, the storage unit 38 of the DBA unit 32 retains both distance information on the distance between each ONU for 1G signals and the OLT 12 and that on the distance between each ONU for 10G signals and the OLT 12.

The control unit 34 controls both timing at which the burst header detection unit for 1G signals 29 performs burst delimiter detection and timing at which the burst header detection unit for 10G signals 28 performs burst delimiter detection. The control unit 34 also predicts the reception period of each of 1G burst signals and 10G burst signals. Then, the control unit 34 outputs an enable signal to the burst header detection unit for 1G signals 29 during the predicted reception period of a 1G burst signal so as to allow the burst header detection unit for 1G signals 29 to perform burst delimiter detection. Accordingly, the situation can be avoided where the burst header detection unit for 1G signals 29 falsely establishes synchronization of a 1G burst signal. Also, the control unit 34 outputs an enable signal to the burst header detection unit for 10G signals 28 during the predicted reception period of a 10G burst signal so as to allow the burst header detection unit for 10G signals 28 to perform burst delimiter detection. Accordingly, the situation can be avoided where the burst header detection unit for 10G signals 28 falsely establishes synchronization of a 10G burst signal.

As described above, even when both 1G burst signals and 10G burst signals are involved, as seen in the present embodiment, false synchronization can be prevented for both 1G burst signals and 10G burst signals by controlling both timing at which the burst header detection unit for 1G signals 29 performs burst header detection and timing at which the burst header detection unit for 10G signals 28 performs burst header detection.

The present invention has been described with reference to the embodiments. The embodiments are intended to be illustrative only, and it will be obvious to those skilled in the art that various modifications to constituting elements or processes could be developed and that such modifications also fall within the scope of the present invention.

For example, although a gigabit Ethernet PON system, such as a GE-PON and a 10G-EPON, is described in the above embodiments, the PON system is not limited thereto. Also, although a 66-bit delimiter pattern is used as a synchronization pattern for establishment of burst signal synchronization in the above embodiments, the synchronization pattern is not limited thereto, either.

What is claimed is:

1. A station-side apparatus for a PON system connected to a subscriber-side apparatus via an optical fiber, the station-side apparatus comprising:
    a receiving unit configured to receive a burst signal from the subscriber-side apparatus;
    a detection unit configured to detect a predetermined synchronization pattern included in the received burst signal so as to establish synchronization of the burst signal; and
    a control unit configured to allow the detection unit to perform detection of a synchronization pattern during a predicted reception period of a burst signal,
    wherein the control unit allows the detection unit to perform detection of a synchronization pattern during a discovery period for which a registration request frame from an unregistered subscriber-side apparatus is accepted, and
    wherein, in response to a receive error in which the synchronization pattern does not match a fixed pattern occurring within the discovery period, the control unit sets discovery periods subsequent to the receive error shorter than discovery periods before the receive error.

2. The station-side apparatus of claim 1, further comprising a dynamic bandwidth allocating unit configured to control a transmission start time and a transmission amount of a burst signal from the subscriber-side apparatus and to retain distance information with regard to a distance between the station-side apparatus and the subscriber-side apparatus, wherein
    the control unit predicts the reception period of a burst signal on a basis of pieces of information with regard to the transmission start time, the transmission amount, and the distance acquired from the dynamic bandwidth allocating unit.

3. The station-side apparatus of claim 1, wherein:
    the receiving unit is configured to receive a burst signal transmitted at a first transmission rate and a burst signal transmitted at a second transmission rate and to switch an output destination of a burst signal in accordance with the transmission rate thereof;
    the detection unit comprises a first detection unit configured to detect a synchronization pattern included in a burst signal transmitted at the first transmission rate, and a second detection unit configured to detect a synchronization pattern included in a burst signal transmitted at the second transmission rate; and
    the control unit allows the first detection unit to perform detection of a synchronization pattern during a predicted reception period of a burst signal transmitted at the first transmission rate and also allows the second detection unit to perform detection of a synchronization pattern during a predicted reception period of a burst signal transmitted at the second transmission rate.

4. A PON system, comprising:
    the station-side apparatus of claim 1; and
    a subscriber-side apparatus connected to the station-side apparatus via an optical fiber.

* * * * *